United States Patent [19]
Tibbals

[11] Patent Number: 5,788,311
[45] Date of Patent: Aug. 4, 1998

[54] COMBINATION STEP AND CARGO SPACE EXTENDER

[76] Inventor: Kerry Wayne Tibbals, P.O. Box 792, Glendive, Mont. 59330

[21] Appl. No.: 466,413

[22] Filed: Jun. 6, 1995

[51] Int. Cl.[6] .................................................. B60R 3/00
[52] U.S. Cl. ........................................... 296/62; 296/26
[58] Field of Search .................................. 296/26, 27, 50, 296/57.1, 62; 280/166

[56] References Cited

U.S. PATENT DOCUMENTS

| | | | |
|---|---|---|---|
| 4,472,639 | 9/1984 | Bianchi | 296/26 |
| 4,596,417 | 6/1986 | Bennett | 296/61 |
| 4,639,032 | 1/1987 | Barbour | 296/62 |
| 4,778,213 | 10/1988 | Palmer | 296/26 |
| 5,154,470 | 10/1992 | Bringman, Jr. | 296/26 |
| 5,468,038 | 11/1995 | Sauri | 296/57.1 |
| 5,478,130 | 12/1995 | Matulin et al. | 296/57.1 |

*Primary Examiner*—Andrew C. Pike
*Attorney, Agent, or Firm*—Rudolf O. Siegesmund

[57] ABSTRACT

A apparatus adapted to be attached to an existing tailgate of a vehicle or to a custom tailgate recessed to accept the device comprises a housing assembly adapted to be mounted on the vehicle tailgate, a chassis assembly slidingly engaged with the housing assembly, and a step assembly rotatably connected to the chassis assembly whereby the chassis assembly can be moved through the housing assembly and rotated so that the step assembly can be rotated out of the chassis assembly.

13 Claims, 6 Drawing Sheets

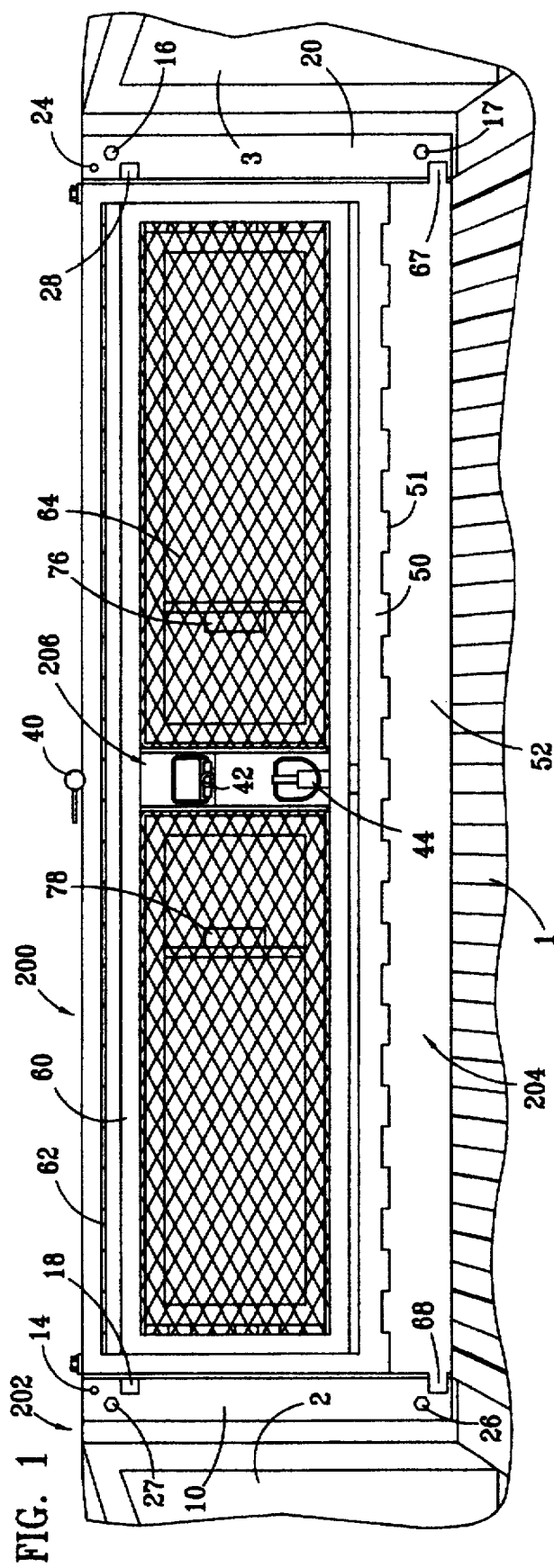
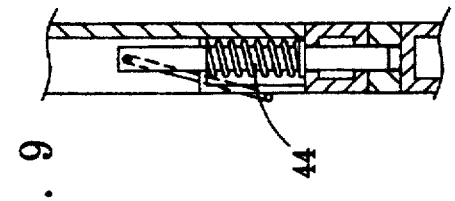
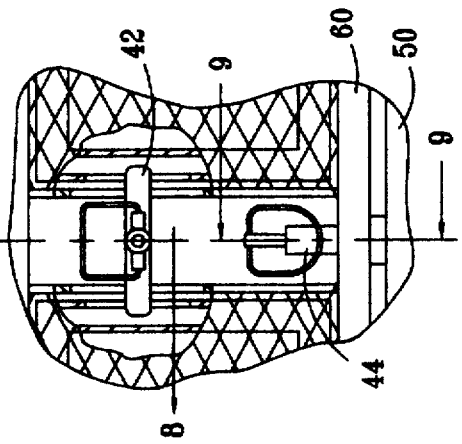

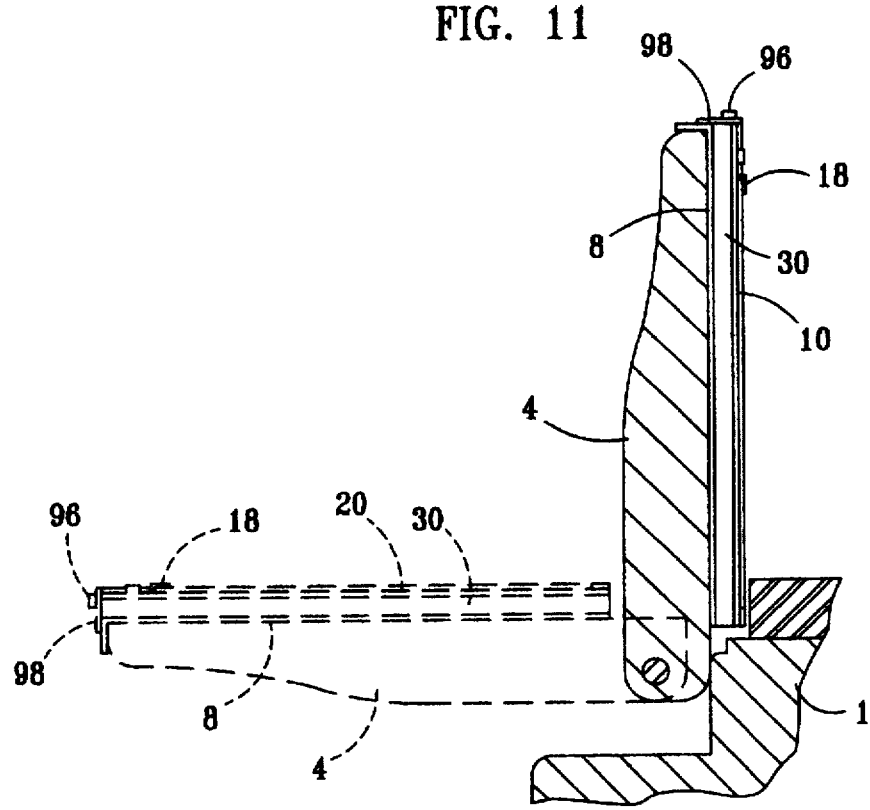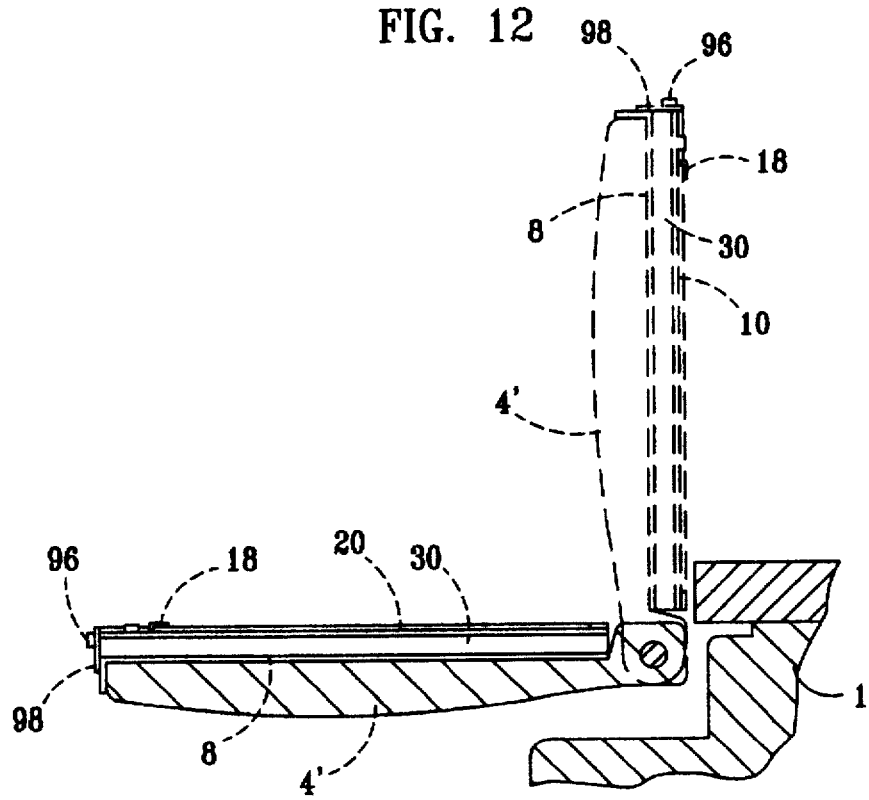

COMBINATION STEP AND CARGO SPACE EXTENDER

FIELD OF THE INVENTION

The present invention is directed, in general, to all vehicles that have a bed of cargo space for carrying articles and more specifically to devices attached to the tailgates of such vehicles that alternatively serve as a folding step to provide easy access to the cargo space and as a cargo space extender.

BACKGROUND OF THE INVENTION

Utility trucks are among the most popular class of motor vehicles and encompass both two- and four-wheel drive vehicles having a rear cargo space accessed by a tailgate. Typically, the rear gate of the truck is lowered from the upright closed position of ninety degrees to the truck bed until it lies flat in the same plane as the truck bed to facilitate loading and unloading of cargo. Once opened the tailgate is either held open by a side chain or folding metal arms. In addition, standard gates may be opened beyond the plane level with the bed of the truck and lowered to a plane one hundred and eighty degrees from the closed position. In either configuration, loading and unloading requires the user to climb in and out of the cargo bed without any aid or with the aid of a portable ladder or step.

Understandably, users load the vehicles with cargo of various sizes, weights, and lengths including articles longer than the bed of the truck. When the cargo length exceeds the bed length, the tailgate may be left open and the load secured by whatever expedient means the user can devise. An open tailgate, however, increases the risk that articles would fall out once the vehicle moved.

Attempts to reconfigure standard tailgates and meet the needs of users include modifications within three categories. The first category includes tailgate extension devices which extend the bed to the end of the tailgate farthest from the vehicle when the tailgate is in its horizontal position. For example, U.S. Pat. No. 4,472,639 directed to providing a retractable structure for extending the truck bed by means of folding metal sides and a rear wall which folds flat against the tailgate is an example of the first type. Another example is U.S. Pat. No. 4,778,213 directed to extending the cargo space by affixing a box-like apparatus to the tailgate. These tailgate extension devices do not provide a way to enter or exit the truck bed and they do not extend the cargo space beyond the farthest end of the tailgate.

The second category includes extension devices which add space beyond the farthest end of the open tailgate. An example of the second type is U.S. Pat. No. 5,154,470 which extends the cargo space not only the length of the horizontal tailgate but beyond the existing tailgate a distance approximately that of the width of the existing tailgate. While the space is extended beyond the farthest end of the tailgate these devices do not address entry or exit of the cargo bed.

The third category includes reconfigurable devices which optionally provide walls for additional space and are also adaptable into another device. U.S. Pat. No. 4,596,427 directed to a cargo space extender that can be taken off and used as a narrow loading ramp for sliding items up into the truck bed or wheeling them up in a one-wheeled device such as a wheelbarrow is an example of the third type. Such reconfigurable devices require that the walls of the extended space must be removed from the vehicle and manually reconfigured into a ramp.

In an effort to make use of the additional cargo space and to also make for easier loading and unloading of the vehicle, it therefore becomes highly advantageous to have a single device that can be used to access the vehicle cargo space for loading and unloading and also repositioned to provide additional cargo space. The areas of difficulty in inventing such a device are: creating a way to help the worker get into and out of the vehicle's cargo space, minimizing the weight of the device for handling, having versatility in the amount of cargo space to include the ability to be self stored, having the ability-to reconfigure the device to do more than one thing, and minimizing the effects of the device in its extended mode on the vehicle when the vehicle is in motion.

The first need beyond the prior art is to create a way to help the user get into and out of the vehicle's cargo space. A truck bed is usually too high for the user to step into. Therefore, the user must climb or jump. One way of increasing the ease of entry is to have a separate ladder or step. However, when the ground is muddy or uneven a separate step or ladder may not work and may be totally undesirable. Furthermore, in order to carry a ladder or steps around with the vehicle the user will be required to store the ladder or steps in the cargo bed space thereby decreasing the cargo space available. The most advantageous device would be one that was attached to the vehicle, that alternatively could be deployed as a step or as a cargo space extender when needed, and that would not reduce the cargo space when stored.

The second need beyond the prior art is to minimize the weight of the device for handling. If a device is attached to the tailgate, then the additional weight may make the combination difficult for one person to lift or lower. Moreover, if the device is extended beyond the tailgate of the truck the additional weight may cause structural bending of the tailgate or its components which connect it to the truck. In addition, a device that is to be carried around as part of the truck should not cause a significant increase in weight that could affect the truck's performance on the road or increase its fuel consumption.

The third need beyond the prior art is to have versatility in the amount of cargo space. Specifically, the vehicle should not lose any of its original cargo space when the device is stored on the truck. Therefore, the device should be capable of self-storage on the vehicle and should fit in such a way that all cargo space is retained. Moreover, when the device is used to extend the cargo space it should have the capability to increase the space out to the farthest end of the horizontal tailgate and also to extend the space beyond the farthest end of the tailgate with the means to support the additional cargo weight that would be placed in that space.

The fourth need beyond the prior art is to have the ability to reconfigure the device to do more than one thing. It should be capable of meeting all of the needs addressed above by being reconfigurable. A caveat of this need is that the ability to reconfigure the device be done in a short time so that no productivity is lost in the process.

The fifth need beyond the prior art is to minimize the effects of the device in its extended mode on the vehicle when the vehicle is in motion. When the tailgate is down in the horizontal position and the cargo space has been extended to the rear, any walls of the device should minimize the air drag which they create and also the effect on the vehicle travelling on the highway at high speed.

Therefore, there exists a need in the art for a combination step and cargo space extender that is lightweight, compact, easy to reconfigure, and rapidly deployable.

SUMMARY OF THE INVENTION

A apparatus adapted to be attached to an existing tailgate of a vehicle or to a custom tailgate recessed to accept the device comprises a housing assembly adapted to be mounted on the vehicle tailgate, a chassis assembly slidingly engaged with the housing assembly, and a step assembly rotatably connected to the chassis assembly whereby the chassis assembly can be moved through the housing assembly and rotated so that the step assembly can be rotated out of the chassis assembly.

BRIEF DESCRIPTION OF THE DRAWINGS

The apparatus of the invention is further described and explained in relation to the following figures of the drawings wherein:

FIG. 1 is an inside view of the invention attached to a truck tailgate with the tailgate closed;

FIG. 7 is a detailed view of the first latch device and second latch device;

FIG. 8 is a cross section of the second latch device taken along line 9—9 of FIG. 7;

FIG. 9 is a detailed view of the first latch device along line 9—9 of FIG. 7;

FIG. 11 is a side view of the invention showing the existing tailgate without a recess; and FIG. 12 is a side view of the invention mounted on a custom tailgate with a recess so that the top of the invention is in the same plane as the vehicle cargo bed.

DESCRIPTION OF PREFERRED EMBODIMENTS

Figure 2:
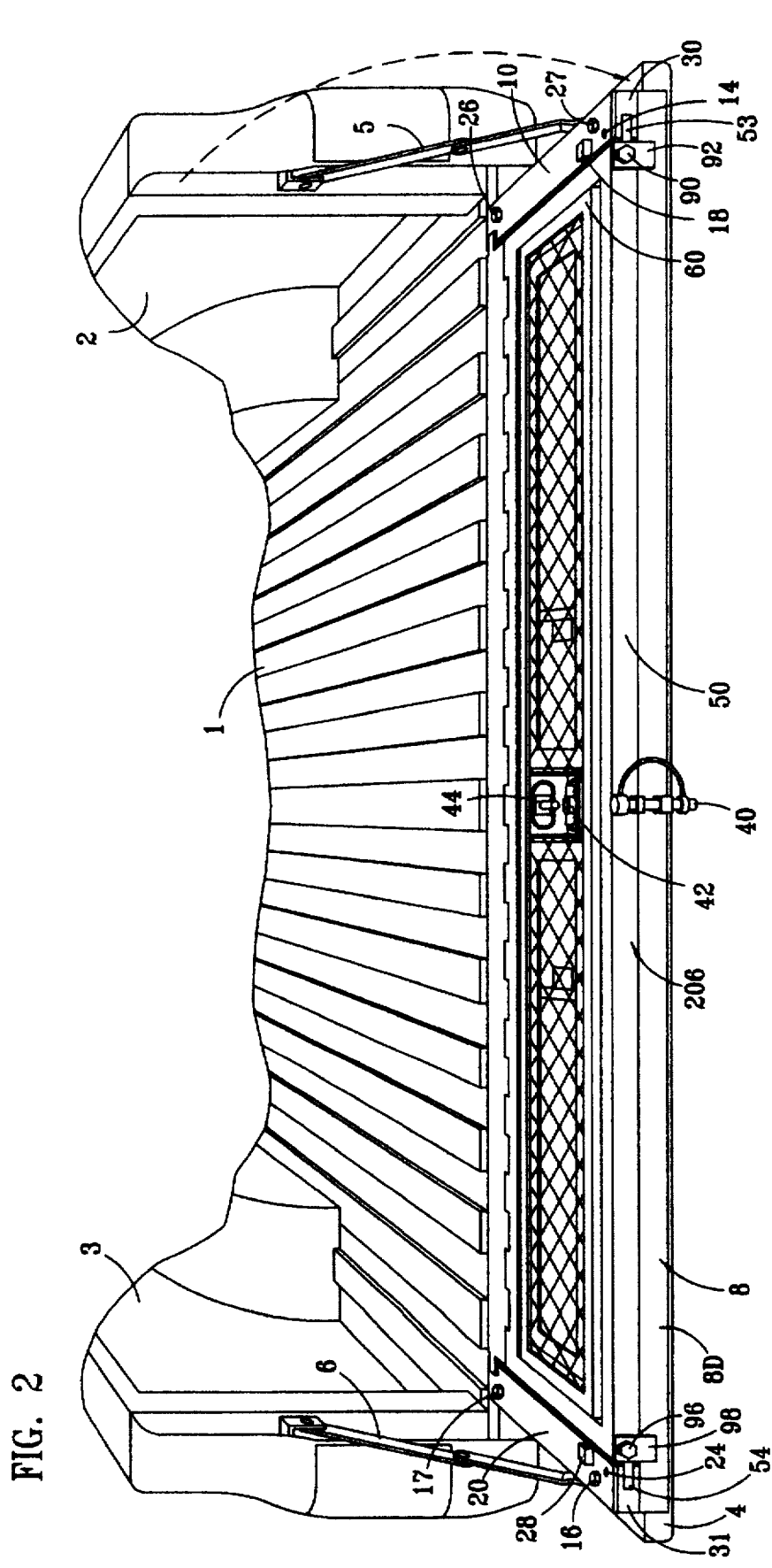
FIG. 2 is an outside view of the invention attached to a vehicle tailgate with the tailgate in the open horizontal position.

According to the present invention, a self-contained step and cargo space extender unit is attachable to either a standard or custom made tailgate of a motor vehicle. In the discussion of the figures, the same numbers will be used to refer to the same or similar components throughout.

FIG. 1 is an elevated view of the preferred embodiment of the invention attached to the motor vehicle tailgate when the vehicle tailgate is in the closed position. The entire self-contained step and cargo space extender unit 200 is shown forming the rear wall of the cargo space defined by the truck bed 1 and the vehicle sides 2 and 3. Only a a small portion of the exisiting tailgate 4 can be seen in FIG. 1 because it is screened from view by the unit 200 which is attached to tailgate 4.

The unit 200 consists of a housing assembly 202 fixed to the tailgate 4, a chassis assembly 204 which slides within the housing assembly 202, and a step assembly 206. The housing assembly 202 consists of a base 8 (not shown in FIG. 1, see FIG. 3), top sections 10,20, and sliding devices 30,31 (not shown in FIG. 1, see FIG. 2 and FIG. 3). The chassis assembly 204 consists of a frame 50, anchor 52, and first hinge 51. The step assembly 206 comprises a container 60, first gate sections 70,80 (not shown in FIG. 1, see FIG. 5), and second gate sections 72,82 (not shown in FIG. 1. see FIG. 5).

The components of unit 200 can be seen in FIG. 1 as follows. Top sections 10, 20 are part of the housing 202 which is the portion of unit 200 which is attached to tailgate 4. Frame 50, anchor 52, and hinge device 51 are the main components of the chassis assembly 204. The step assembly consists of container 60 and additional parts contained within the container 60 which will be discussed below.

FIG. 2 is a perspective view of the invention depicting unit 200 attached to tailgate 4 with tailgate 4 deployed in the horizontal position. The cargo space defined by bed 1 and side walls 2,3 is now open for loading or unloading. In FIG. 2 the third latch 40 is closed so that the unit 200 cannot be deployed. The additional components of the housing assembly 202 can be seen in FIG. 2. Base 8 and sliding devices 30,31 are shown. Top sections 10,20 are positioned so that they are parallel to the sides of tailgate 4 and so that they can hold sliding devices 30,31 between top section 10,20 and base 8. Fasteners 16,17,26,27 pass through holes in top sections 10,20, sliding devices 30,31, and base 8 and secure the housing assembly 202 to tailgate 4. FIG. 2 also shows the step assembly 206 folded flat within the frame 50.

Frame 50 is secured from sliding by bolts 15 (See FIG. 10) through holes 14,24 for receiving bolts 15 (see FIG. 10 for bolts 15) and by third latch 40. Therefore, there are three points at which frame 50 can be secured and locked in position when tailgate 4 is either closed as in FIG. 1 or opened as in FIG. 2 and the vehicle is moving without the need for the extended cargo space. Once third latch 40 and bolts 15 are removed the unit 200 shown in FIG. 2 is ready to be deployed.

Figure 3:
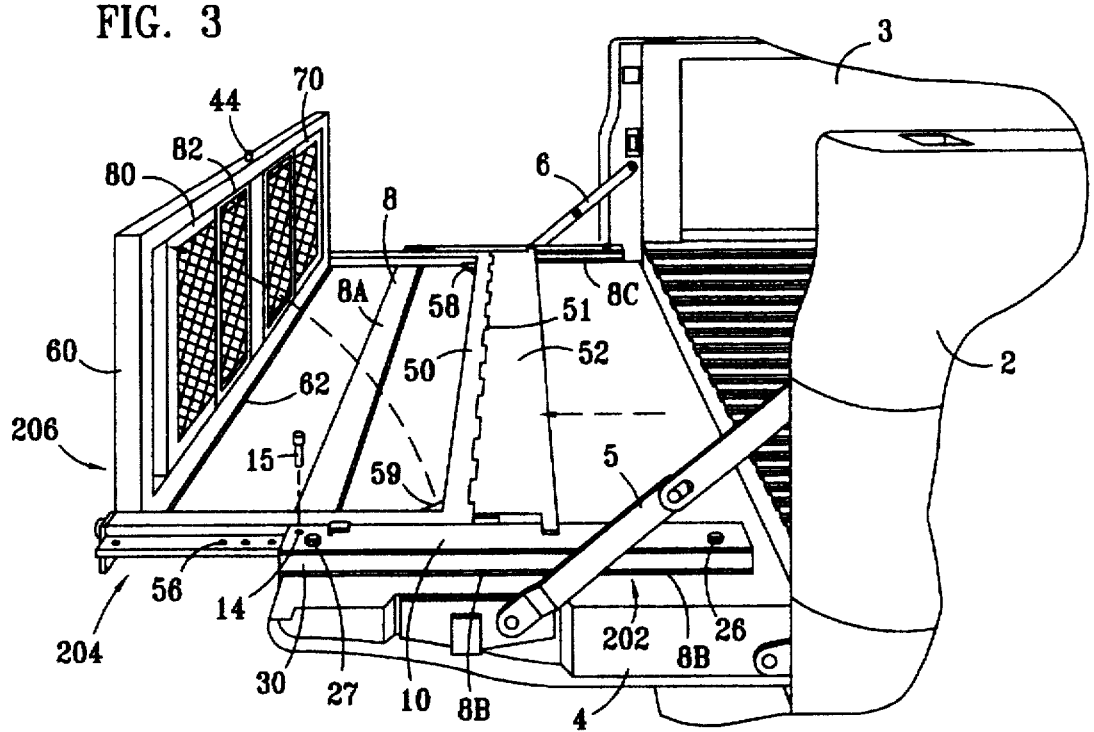
FIG. 3 is a side elevational view showing the chassis assembly partially deployed and the step assembly of the invention rotated ninety degrees upward.

FIG. 3 is a side elevational view showing the step assembly of the invention rotated ninety degrees out of the chassis assembly 204 and the chassis assembly 204 moved approximately halfway through the housing assembly 202. Frame So is slidingly engaged with sliding devices 30,31 so that the frame can slide easily back and forth in the housing 202. Frame 50 is movably connected to anchor 52 by first hinge device 51. Anchor 52 is also slidingly engaged with the sliding devices 30,31 in the housing assembly 202.

Figure 6:
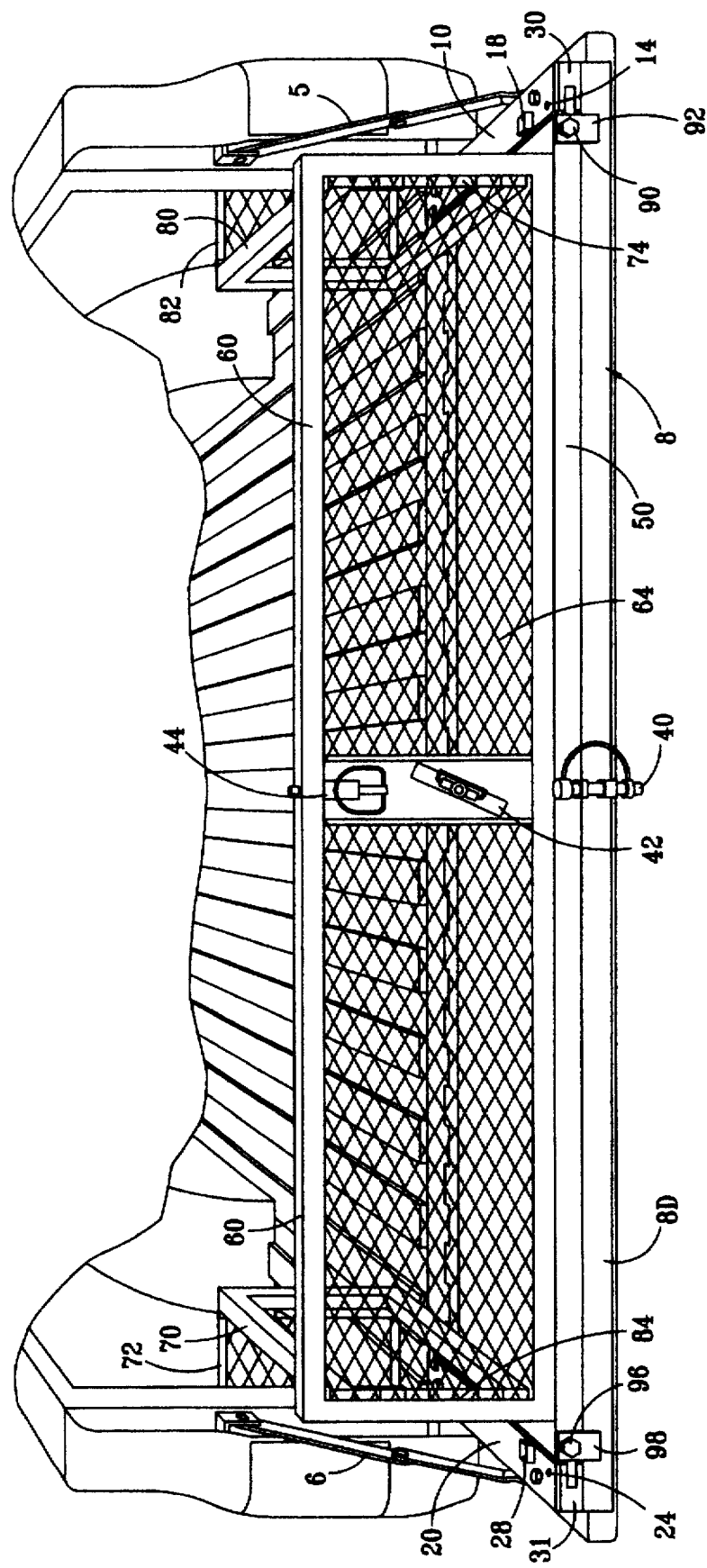
FIG. 6 is a rear elevational view of invention with the step assembly configured as a cargo space extender.

In FIG. 3 further details of the housing assembly 202 can be seen. Unit 200 is attached to the tailgate 4 by the housing assembly 202. Base 8 has three sides, a top 8A, a first arm 8B, and a second arm 8C. The function of base 8 is to provide a secure mounting surface for unit 200 to tailgate 4. The attachment of base 8 to tailgate 4 strengthens tailgate 4 by adding rigidity to the existing structure. The top of base 8 has a lip 8D at a right angle to the top 8A which fits over the existing tailgate 4. The lip 8D is an integral part of the base as shown in FIGS. 2 and 6. First arm 8B and second arm 8C of base 8 are parallel to each other and at right angles to top 8A. First arm 8B and second arm 8C of base 8 extend from top 8A inside of tailgate supporting arms 5,6 so that there is sufficient space for tailgate supporting arms 5,6 to operate.

Tailgate 4 is drilled to receive fasteners such as bolts 16,17,26,27 which will secure the unit 200 to the tailgate 4. A template (not shown) is placed on tailgate 4 to mark the location of the holes for receiving fasteners 16,17,26,27. The said holes are drilled and cert nuts (not shown) installed so that the tailgate is ready to receive the fasteners 16,17,26,27.

In the preferred embodiment sliding devices 30,31 are created by sandwiching three plastic pieces (not shown) between base 8 and top sections 10,20. Two of the three plastic pieces are the same width and length as top sections 10,20 and the third piece is the same length and approximately two thirds the width of the top sections 10,20. The narrowest plastic pieces are positioned between the two wider plastic pieces and aligned with the outside edges of the wider plastic pieces. The top sections 10,20 have holes for receiving fasteners 16,17,26,27. Corresponding holes are drilled through sliding devices 30,31 and base 8 in a line so that fasteners 16,17,26,27 can be passed through top sections 10,20, sliding devices 30,31, base 8, and tailgate 4 and be secured by cert nuts (not shown). Once assembled a groove or channel is formed in the plastic pieces which faces the inside of tailgate 4. The type of material used for the plastic pieces should be plastic with low friction. One type of such plastic is called "Super Glide".

In another embodiment of the invention the sliding devices 30,31 can be made of a single piece of plastic fabricated with a groove for receiving the chassis assembly 204. Additionally, the sliding devices 30,31 can consist of material containing rollers. Additional means for providing the sliding engagement of the chassis assembly 204 will be readily apparent to those skilled in the art.

Holes for receiving fasteners 16,17,26,27 in base 8, in top sections 10,20, and in sliding devices 30,31 are elongated so that movement can take place before fasteners 16,17,26,27 are tightened down. Therefore, once base 8, sliding devices 30,31, and top sections 10,20 are in position, fasteners 16,17,26,27 are tightened down.

Once housing assembly 202 is mounted on tailgate 4, chassis assembly 204 can be moved within the housing assembly 202. Chassis assembly 204 comprises frame 50, anchor 52, and first hinge device 51. Chassis assembly 204 is slidingly engaged with housing assembly 202 so that flanges 53,54 of frame So fit within sliding devices 30,31. Anchor 52 is hinged to frame 50 by hinge 51 and also has flanges (not shown) which fit in sliding devices 30,31.

Forward movement of frame 50 and anchor 52 is controlled by the stops 18,28. Top sections 10,20 have stops 18,28 located as shown in FIGS. 1 and 2. The general location of stops 18,28 is on the top portion of top sections 10,20 rear fasteners 16,27. Stops 18,28 are sufficiently spaced from fasteners 16,27 to allow a tool such as a wrench to be fitted to fasteners 16,27. Furthermore, stops 18,28 are positioned so that the outside edge of stops 18,28 are flush with the inside edge of top sections 10,20. Stops 18,28 are fixedly attached to top sections 10,20. Stops 18,28 are welded to top sections 10,20 so that a cavity for receiving fins 67,68 is created. Stops 18,28 could also be cast as part of top sections 10,20; however, the less expensive mode of manufacture would be to weld stops 18,28 to top sections 10,20.

Anchor 52 has the fins 67,68 which protude from the sides of anchor 52. Fins 67,68 are the same width as the stops 18,28, and as anchor 52 slides in sliding devices 30,31 movement of anchor 52 will be arrested when fins 67,68 seat themselves in stops 18,28. When fins 67,68 are seated inside stops 18,28 anchor 52 is fixed from moving further and also is given support from forces causing it to rotate upward. Frame 50, anchor stops 18,28, and fins 67,68 will come in contact when frame 50 and anchor 52 slide towards the user who is pulling the chassis assembly 204 through the housing assembly 202. When frame 50 and anchor 52 have slid far enough frame 50 can rotate ninety degrees downward over the farthest end of tailgate 4 on first hinge 51 connecting frame 50 and anchor 52.

Movement toward the vehicle of frame 50 and anchor 52 are correspondingly halted when chassis assembly 204 has slid toward the toward the vehicle. As chassis assembly 204 slides through housing assembly 202 movement is stopped by the tabs 92,98 attached to frame 50 by the bolts 90,96. Alternatively, tabs 92,98 can be welded on; however, holes for receiving bolts 90,96 are also used for installation of the hooks 131 (see FIG. 10) in an extended load configuration.

Figure 4:
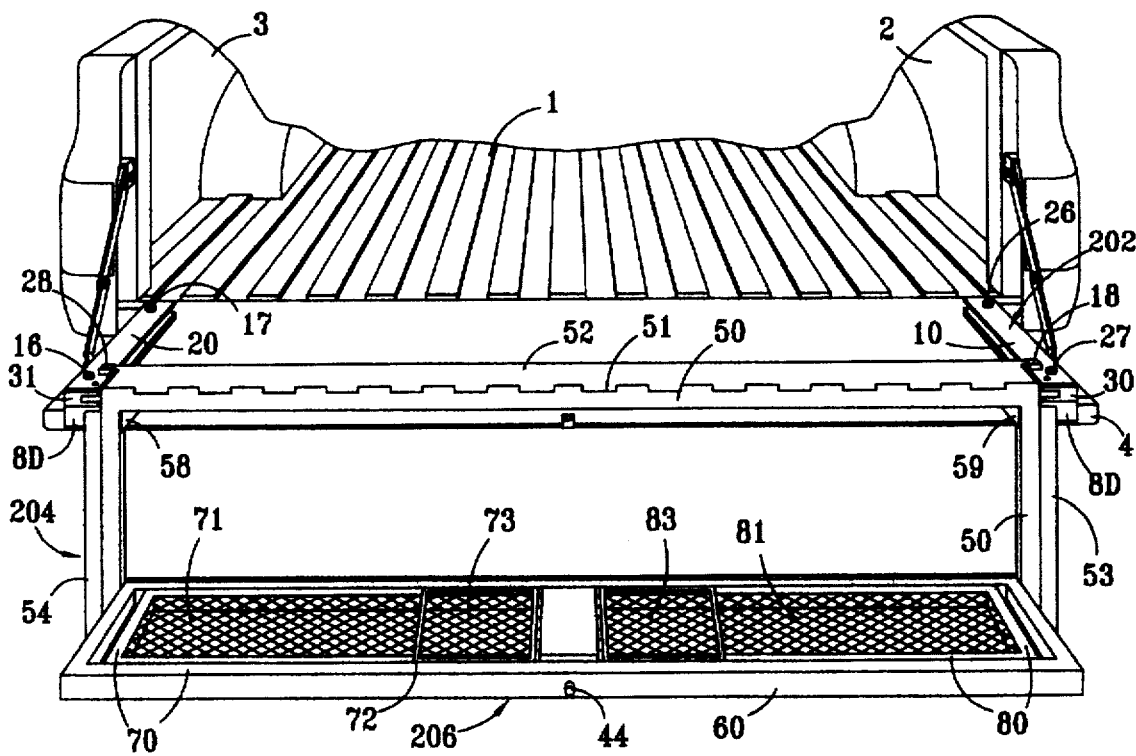
FIG. 4 is a rear perspective view of the invention with the chassis assembly fully extended and the step assembly deployed and secure in the open position.

FIG. 4 is a rear perspective view of the invention with the chassis assembly 204 fully extended and the step assembly 206 deployed and secure in the open position. The step function of the combined step and cargo extender unit 200 is performed as follows. Bolts 15, are removed, third latch 40 is released, and frame 50 is pulled manually by the user through the housing assembly 202 toward the user. Frame 50 moves in the sliding devices 30,31 and moves away from the vehicle connected to anchor 52 by hinge 51. Movement stops when fins 67,68 seat themselves in stops 18,28. Frame 50 is rotated ninety degrees downward from the horizontal plane until frame 50 is at an angle of ninety degrees to tailgate 4. The rotation is allowed by first hinge 51 connecting anchor 52 to frame 50. Anchor 52 remains in the horizontal plane. The bottom of frame 50 comes in contact with the lip 8D which rests on tailgate 4. FIG. 4 depicts frame 50 in this position. FIG. 4 also shows flanges 53,54 used to guide frame 50.

When frame 50 is rotated downward step assembly 206 can be deployed. Step assembly 206 comprises container 60, the first gate sections 70,80, and the second gate sections 72,82. Container 60 is connected to frame 50 by the second hinge device 62. Container 60 is held in position with frame 50 by the first latch 44. When first latch 44 is released container 60 rotates on second hinge device 62 until container 60 comes in contact with the surface of frame 50 and is held in a position parallel to bed 1 and perpendicular to downward pointing frame 50.

The first gate section sides 71,81 and the second gate section sides 73,83 are made of diamond expanded metal mesh. The diamond mesh saves weight and offers less resistance to wind when the vehicle is travelling with the cargo extender deployed. The diamond expanded metal mesh provides good tractions and allows air to flow through the unit. Any suitable hard material that can provide strength and multiple openings can be substituted for steel such as aluminum or composite materials. Another means for providing light weight and less resistance to wind is to use metal stamping to create various patterned spaces. Additional methods and materials will be readily apparent to those skilled in the art.

The advantages that come from the above step and cargo space extender are many. The step assembly 206 helps the user get into and out of the vehicle's cargo space without climbing or jumping and without reliance on a separate device. The step assembly 206 has the advantage of the separately carried step or ladder; however, it satifies the need to function when the ground is muddy or uneven. Since the device is attached to the vehicle it can be extended whenever needed and will function even if the vehicle is on a hill or slope.

In another embodiment of the present invention, multiple step assemblies (not shown) similar to step assembly 206 can be enclosed within the chassis assembly 204 for use on large vehicles.

Figure 5:
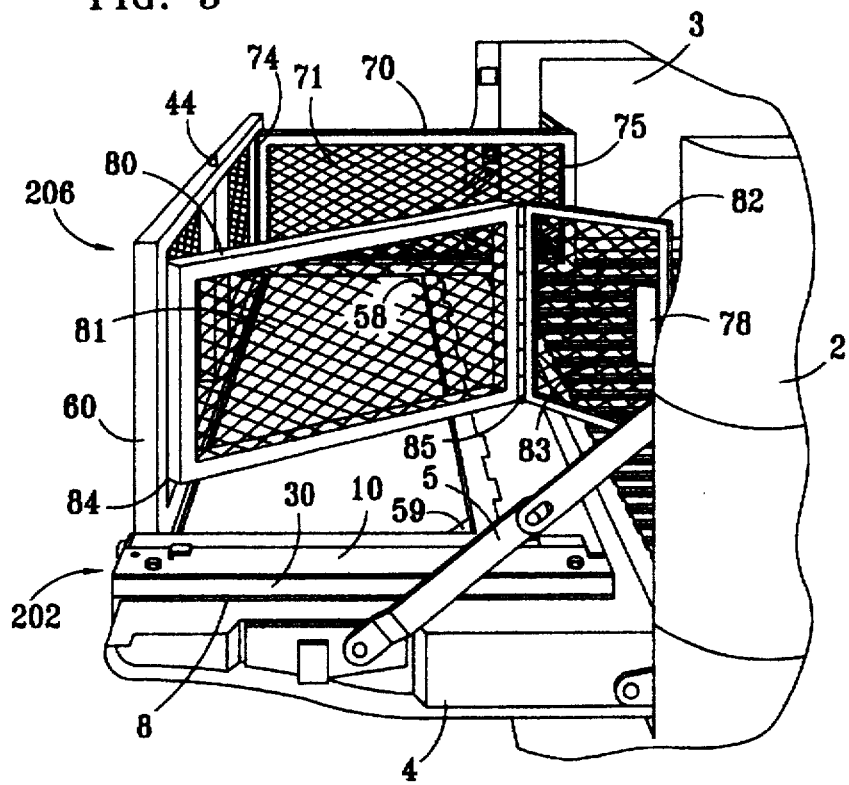
FIG. 5 is a side elevational view of the invention depicting the deployment of the first and second gate elements out of the container of the step assembly.

The reconfigurable capability of the step and cargo space extender unit 200 is shown in FIGS. 5 and 6. FIG. 5 is a side elevational view of the invention depicting the deployment of the first gate sections 70,80 and the second gate sections 72,82 out of container 60 of the step assembly 206.

Once the vehicle is loaded, it may be desirable to extend the available cargo space. Unit 200 can be redeployed in order to provide additional cargo space as follows. Container 60 is folded back into the frame 50. Container 60 rotates on second hinge 62 until movement of container 60 is stopped by the rests 58,59. Frame 50 is rotated ninety degrees upward and slid back between sliding devices 30,31 until stopped by the tabs 92,98. Frame 50 is locked in position by bolts 15 and third latch 40. Container 60 is released and rotated ninety degrees until it is pointing skyward at a ninety-degree angle to tailgate 4. Second latch 42 is released allowing gate first sections 70,80 and gate second sections 72,82 to rotate outward. Gate first sections 70,80 are connected to container 60 by third hinge devices 74,84. Gate second sections 72,82 are connected by fourth hinge devices 75,85 to gate first sections 70,80. Therefore, on each side of container 60 gate first sections 70,80 are rotated outward until gate first sections 70,80 are ninety degrees to container 60. At that point gate second sections 72,82 are rotated a further ninety degrees until they are parallel to container 60 and pointing to sides 2,3. Magnets 76,78 on the outside of the gate second sections 72,82 engage sides 2,3 to hold gate second sections 72,82 in position.

FIG. 6 is a rear elevational view of the invention with step assembly 206 properly configured as a cargo space extender. Container 60 defines the rear of the cargo space and gate first sections 70,80 and gate second sections 72,82 defines the sides.

When tailgate 4 is down in the horizontal position and the cargo space has been extended to the rear, the walls of the extended cargo space comprising the container 60, first gate sections 70,80, and second gate sections 72,82 minimize air drag because the large spaces are filled by diamond mesh steel or other surfaces that allow air to flow through. Therefore, when the vehicle is travelling on the highway at high speeds no unusual aerodynamic effects will surprise the vehicle driver.

Weight is minimized because the combination device uses one part to perform another function. Weight is further minimized because the unit 200, in its preferred embodiment, can be attached to a custom tailgate 7 having a recessed space to receive unit 200. Weight can be further minimized by choosing lightweight yet strong materials to build the apparatus. Steel is the preferred material because of its superior strength. However, lightweight alloys having high strength and which are not brittle can also be used. Aluminum can be used as fabricating material as can composite materials and ultrahard plastics. The characteristics of the materials chosen are that they should be able to withstand vibration, wear from hard use, not expand too much in high temperatures and not contract too much in cold weather, not become malleable in heat or brittle in cold, and be rust and corrosion resistant/proof. When selecting materials having these characteristics the best combination with the lowest weight will be the most suitable.

The present invention has the ability to reconfigure to function as a step and also as a versatile cargo space extender. One advantage of this design is the speed with which unit 200 can be configured to deploy step assembly 206 and the speed with which it can also be reconfigured as a cargo space extender as shown in FIG. 6. The user movements required to manipulate unit 200 are fluid and the apparatus locks into position by itself without any additional parts being employed. Because of its unitary design each movement is short and can be done by one person with almost no time lost in the deployment.

FIG. 7 is a detailed view of first latch device 44 and second latch device 42 which are positioned in the center of the container 60.

FIG. 8 is a cross section of second latch device 42 taken along line 8—8 of FIG. 7. Second latch device 42 secures first gate sections 70,80 and second gate sections 72,82.

FIG. 9 is a detailed view of first latch device 44. First latch device 44 secures step assembly 206 in frame 50 until it is needed for deployment.

Figure 10:
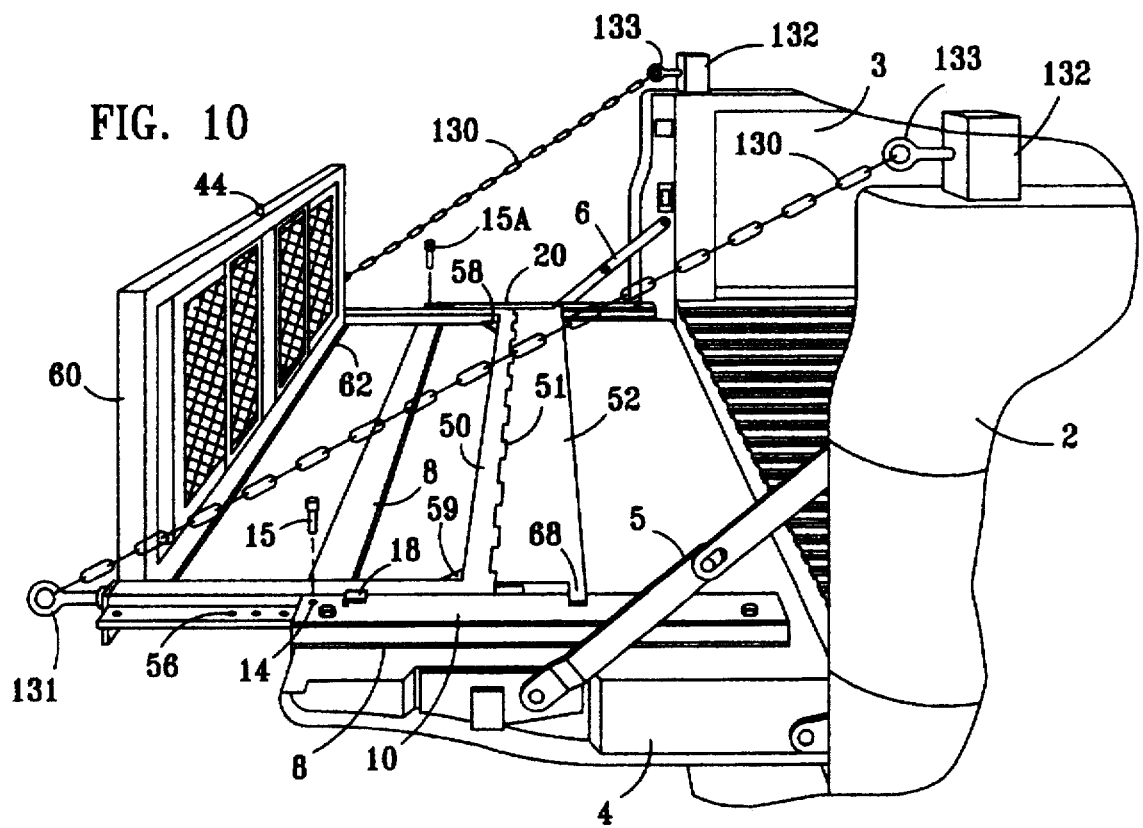
FIG. 10. is a side elevational view of the chassis assembly deployed in an extended load configuration, the step assembly rotated ninety degrees upward and chains used for additional support.

FIG. 10. is a side elevational view of chassis assembly 204 deployed in an extended load configuration, step assembly 206 roated ninety degrees upward and the chains 130 used for support.

A further function of the preferred embodiment is that it can be reconfigured to provide additional cargo space beyond the farthest end of tailgate 4 for some loads. The cargo space may be extended by locking frame 50 in position halfway through housing assembly 202 and securing the extended platform created by means of the chains 130. Frame 50 can be locked in the intermediate position by placing bolts 15 in holes 56 for receiving bolts 15. This configuration is particulary advantageous for farm loads such as bales of hay. Frame 50 is horizontal. Container 60 is released from its position within frame 50 by releasing first latch 44. First gate sections 70,80 and second gate sections 72,82 are not deployed and remain secured by second latch device 42. Chains 130 are attached to frame 50 and to sides 2,3 by the hooks 131, the stakes 132, and the stake hooks 133. Stakes 132 are secured in holes in sides 2,3 for receiving stakes 132. Hooks 131 go in the same holes for receiving bolts 90,96. Therefore, bolts 90,96 must be removed in order to position the hooks. In another embodiment of the present invention hooks 131 can be installed in place of bolts 90,96 so that hooks 131 are already in position when needed. In addition to supporting the tailgate 4 and the chassis assembly 204, chains 130 provide a way to keep the load from shifting out of the newly created cargo space.

Moreover, when the device is extended beyond the tailgate of the truck the additional weight is supported by the stakes and chains which hook to the stake holes on the truck walls and connect to the hooks that can be inserted in the frame. Therefore, unit 200 meets the need of extending the cargo space beyond the farthest end of the vehicle tailgate when the vehicle tailgate is in the horizontal position.

In a further embodiment of the present invention, the space created by deployed step assembly 206 can be increased by using a set of separate wing gates that can be attached to step assembly 206 to create additional cargo space. The reason for using separate wing gates rather than first gate elements 70,80 and second gate elements 72,82 built into container 60 of step assembly 206 is that separate wing gates can capture additional inches of cargo space and further increase the speed of deployment. Another advantage of wing gates is that they can be attached to step assembly 206 and truck sides 2,3 by a securement device and a securement device cap so that the structure created will have additional strength.

Wing gates are removably attached and are not integral parts of unit 200. A left wing gate consists of a first section, a second section, and a third section. A left wing gate can be removably attached to container 60 and side 3 by means of securement device and securement device cap. A right wing gate would be a mirror copy of a left wing gate.

Container 60 rests securely against frame 50. Hinge 62 connecting container 60 and frame 50 makes a ninety degree fold so that no hangers or other support means are necessary to stabilize the step in its deployed position. Container 60 does not require any other support and can now take the full load of personnel standing on the step and carrying loads on the step. Container 60 can now be used to climb into and out of the vehicle and to load and unload the vehicle.

FIG. 11 is a side view of the invention showing the existing tailgate without a recess. A further example of the present invention's versatility is that it can be attached to the inside (shown) or the outside (not shown) of the existing tailgate. Therefore, the disadvantage of the lost interior space can be remedied when attached to an existing tailgate by attaching the invention to the outside wall of the vehicle tailgate.

FIG. 12 is a side view of the unit 200 mounted on a custom tailgate 7 having a recessed space for receiving unit 200 whereby unit 200 lies in the same plane as the vehicle cargo bed 1. When the unit 200 is attached to tailgate 4, the apparatus takes up several inches of space in the cargo are defined by bed 1 and sides 2,3 which are subtracted from the available cargo space. In other words some space is lost because when the apparatus is folded for storage it fits on tailgate 4 and adds the width of unit 200 to the width of tailgate 4. In another embodiment of the present invention a custom tailgate 7 having a recess space for receiving unit 200 is used. Stored unit 200 does not extend into the cargo space to take even a few inches away. Furthermore, when tailgate 7 is in the horizontal position the plane of bed 1 and unit 200 is even. Therefore, when the unit 200 is stored as shown in FIG. 1 it will not cause any cargo space to be lost. Furthermore, when unit 200 is deployed as shown in FIG. 6 the bed of the truck and tailgate 7 with unit 200 attached will be even and in the same horizontal plane. Therefore, objects lying flat on the bed of the truck and extending into the expanded cargo space will have support for their entire length.

Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims. Other alternatives and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

What is claimed is:

1. A combination step and cargo space extender apparatus for a vehicle having a tailgate, said apparatus comprising:
   (a) a housing assembly adapted to be mounted on the vehicle tailgate;
   (b) a chassis assembly slidingly and rotatably engaged with the housing assembly; and
   (c) a step assembly rotatably connected to the chassis assembly;
   wherein the chassis assembly can be moved through the housing assembly to a first position and rotated downward to a second position allowing rotatable deployment of the step assembly about said chassis assembly.

2. The combination step and cargo space extender apparatus of claim 1, wherein said housing assembly comprises:
   (a) a base adapted to be attached to the tailgate;
   (b) a plurality of sliding devices attached to the base; and
   (c) a plurality of top sections attached to the plurality of sliding devices;
   wherein the chassis assembly is slidingly engaged with the plurality of sliding devices so that the chassis assembly can move back and forth freely within the housing assembly.

3. The combination step and cargo space extender apparatus of claim 1 wherein said chassis assembly comprises:
   (a) a frame slidingly engaged with the housing assembly;
   (b) an anchor rotatably connected to the frame and slidingly engaged with the housing assembly; and
   (c) a first hinge device rotatably connecting the anchor and the frame;
   wherein the frame can be pulled through the housing assembly to a position wherein said frame can rotate about said first hinge device downward ninety degrees until it is perpendicular to the anchor and to the housing assembly.

4. A combination step and cargo space extender apparatus for a vehicle having a tailgate, said apparatus comprising:
   (a) a housing assembly adapted to be mounted on the vehicle tailgate;
   (b) a chassis assembly slidingly and rotatably engaged with the housing assembly;
   wherein the chassis assembly can be moved through the housing assembly to a first position and rotated downward to a second position allowing rotatable deployment of a step assembly about said chassis assembly; and
   (c) the step assembly rotatably connected to the chassis assembly wherein the step assembly comprises:
      (1) a container attached to the chassis assembly by a second hinge device;
      (2) a plurality of first gate sections attached to the container by a plurality of third hinge devices; and
      (3) a plurality of second gate sections attached to the plurality of first gate sections by a plurality of fourth hinge devices;
   wherein the first gate sections and the second gate sections can be rotated about said third hinge devices until the first gate sections are approximately at right angles to the container and the second gate sections can be further rotated about said fourth hinge devices ninety degrees until they are at approximate right angles to the first gate sections and parallel to the container.

5. The combination step and cargo space extender apparatus of claim 4, wherein the housing assembly comprises:
   (a) a custom tailgate wherein said custom tailgate is capable of substitution with the tailgate of the vehicle, and said custom tailgate having a recess space;
   (b) a base adapted to be attached to the recess space of said custom tailgate;
   (c) a plurality of sliding devices attached to the base; and
   (d) a plurality of top sections attached to the plurality of sliding devices;
   wherein the chassis assembly is slidingly engaged with the plurality of sliding devices so that the chassis assembly can move back and forth freely within the housing assembly.

6. A combination step and cargo space extender apparatus for a vehicle having a tailgate, and a cargo space enclosed by a plurality of vehicle sides, a vehicle bed, and the tailgate when the tailgate is in an upright position, said apparatus comprising:
   (a) a housing assembly comprising a base, a plurality of sliding devices, and a plurality of top sections, wherein said base, said plurality of sliding devices, and said plurality of top sections are attached to each other by a plurality of fasteners;

(b) a chassis assembly comprising a frame, an anchor, and a first hinge device, wherein said frame and said anchor are rotatably attached by said first hinge device, and further wherein said frame and said anchor are slidingly engaged to said housing assembly by engagement with said sliding devices; and (c) a step assembly comprising a container, a plurality of first gate sections, a plurality of second gate sections, a second hinge device, a plurality of third hinge devices, and a plurality of fourth hinge devices, wherein the container is attached to the frame by the second hinge device, the plurality of first gate sections are rotatably attached to the container by the plurality of third hinge devices, and the second gate sections are attached to the first gate sections by the plurality of fourth hinge devices;

wherein the chassis assembly can be moved through the housing assembly to a first position and rotated about said first hinge device and wherein the step assembly can be rotated about said second hinge device, and wherein the first gate sections and the second gate sections can be rotated about said third hinge devices until the first gate sections are approximately at right angles to the container and the second gate sections can be rotated about said fourth hinge devices until they are at approximate right angles to the first gate sections and parallel to the container.

7. The combination step and cargo space extender apparatus of claim 6 wherein the apparatus is constructed of steel, aluminum, or alloys.

8. The combination step and cargo space extender apparatus of claim 6 further comprising a custom vehicle tailgate wherein said custom vehicle tailgate is capable of substitution with the tailgate of the vehicle, and said custom vehicle tailgate having a recess space adapted for mounting the housing assembly.

9. A combination step and cargo space extender apparatus for a vehicle having a cargo space, said cargo space including opposite side walls, a floor having a rearward edge position, and a tailgate pivotally mounted at the rearward edge position of the floor such that when the tailgate is in an upward position, it closes said cargo space, said apparatus comprising:

(a) a base adapted to be mounted on the vehicle tailgate having a top having a first end and a second end, a first arm perpendicular to the first and of the top, a second arm perpendicular to the second end of the top parallel to the first arm, and a lip perpendicular to the top;

(b) a plurality of sliding devices adapted to be attached to the base;

(c) a plurality of top sections adapted to be attached to the plurality of sliding devices;

(d) a frame having a first flanged side and a second flanged side wherein the first flanged side and the second flanged side are slidingly engaged with said sliding devices;

(e) a first hinge device connecting the frame and an anchor;

(f) a second hinge device connecting the frame and a container;

(g) a plurality of third hinge devices;

(h) a plurality of fourth hinge devices;

(i) the container connected to the frame by the second hinge device;

(j) a plurality of first gate sections connected to the container by the plurality of third hinge devices; and (k) a plurality of second gate sections connected to the plurality of first gate sections by the plurality of fourth hinge devices;

wherein
(1) the frame and the anchor can be moved through the sliding devices,
(2) the frame can be rotated about said first hinge device approximately ninety degrees,
(3) the container can be rotated about said second hinge device approximately ninety degrees, and
(4) the first gate sections and the second gate sections can be rotated about said third hinge devices until the first gate sections are approximately at right angles to the container and the second gate sections can be further rotated about said fourth hinge devices ninety degrees until they are at approximate right angles to the first gate sections and parallel to the container.

10. The combination step and cargo space extender apparatus of claim 9 further comprising a custom tailgate with a cargo wall having a recessed space in the cargo wall adapted for attachment of the base, the plurality of sliding devices, and the plurality of top sections.

11. The combination step and cargo space extender apparatus of claim 9 further comprising a support system comprising:

(a) a plurality of hooks, a plurality of chains having a first end and a second end, a plurality of stake hooks, and a plurality of stakes wherein the plurality of hooks are connected to the first ends of the plurality of chains, the second ends of the plurality of chains are connected to the plurality of stake hooks, and the plurality of stake hooks are attached to the plurality of stakes;

(b) a plurality of holes in the opposite walls of the cargo space for receiving the plurality of stakes; and (c) a plurality of holes in the container for receiving the plurality of hooks.

12. The combination step and cargo space extender apparatus of claim 9 wherein the apparatus is constructed of steel, aluminum, or alloys.

13. The combination step and cargo space extender apparatus of claim 9 further comprising:

(a) the anchor further comprising a plurality of fins fixedly attached to the anchor;

(b) the plurality of top sections further comprising a plurality of stops fixedly attached to the plurality of top sections;

(c) the frame further comprising a plurality of holes for receiving a plurality of bolts; and (d) a plurality of tabs having a plurality of holes for receiving the plurality of bolts, said tabs being attached to said frame by said bolts;

wherein movement of the anchor away from the vehicle is arrested by the fins engaging the stops and movement of the frame toward the vehicle is arrested by the tabs contacting the base.

* * * * *